United States Patent
Arnold et al.

(10) Patent No.: US 10,423,873 B2
(45) Date of Patent: Sep. 24, 2019

(54) INFORMATION FLOW ANALYSIS FOR CONVERSATIONAL AGENTS

(71) Applicant: INTERNATIONAL BUSINESS MACHINES CORPORATION, Armonk, NY (US)

(72) Inventors: Matthew Richard Arnold, Ridgefield Park, NJ (US); Julian Timothy Dolby, Bronx, NY (US); Martin Hirzel, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

(21) Appl. No.: 15/829,009

(22) Filed: Dec. 1, 2017

(65) Prior Publication Data

US 2019/0171925 A1    Jun. 6, 2019

(51) Int. Cl.
*G10L 15/01* (2013.01)
*G06N 3/00* (2006.01)
*G06F 17/28* (2006.01)
*G06F 16/332* (2019.01)
*G06F 16/33* (2019.01)

(52) U.S. Cl.
CPC ......... *G06N 3/008* (2013.01); *G06F 16/3329* (2019.01); *G06F 17/289* (2013.01); *G06F 16/3344* (2019.01)

(58) Field of Classification Search
CPC ... G10L 15/01; G10L 15/22; G10L 2015/221; G10L 2015/223; G10L 2015/225; G06F 11/36; G06F 11/362; G06F 11/3636; G06F 16/3329; H04M 3/493; H04M 3/4936

USPC ............ 704/270, 275; 379/76, 88.01, 88.18, 379/1.02; 717/124, 125, 131
See application file for complete search history.

(56) References Cited

U.S. PATENT DOCUMENTS

| | | | | |
|---|---|---|---|---|
| 6,061,059 A | * | 5/2000 | Taylor | G06F 9/451 717/125 |
| 6,173,266 B1 | * | 1/2001 | Marx | G10L 15/22 704/270 |
| 7,853,453 B2 | * | 12/2010 | Potter | G10L 15/01 704/270.1 |

(Continued)

OTHER PUBLICATIONS

Cytron et al., "Efficiently Computing Static Single Assignment Form and the Control Dependence Graph," ACM Transactions on Programming Languages and Systems, Oct. 1991, pp. 451-490, vol. 13, No. 4.

*Primary Examiner* — Martin Lerner
(74) *Attorney, Agent, or Firm* — Patent Portfolio Builders (57) ABSTRACT

Information flow analysis is conducted on conversational flow specifications of conversational agents. The conversational flow specification prescribes operation of a conversational agent and includes actions to be taken, inputs triggering the actions and input confirmations executed after receipt of a given input and before triggering a given action. The actions, inputs and input confirmations define conversational flow paths through the conversational flow specification. Unconfirmed conversational flow paths through the conversational flow specification are identified and reported to the author of the conversational flow specification. Each unconfirmed conversational flow path only contains inputs and actions and no input confirmations.

20 Claims, 6 Drawing Sheets

(56) References Cited

U.S. PATENT DOCUMENTS

| | | | | |
|---|---|---|---|---|
| 8,326,643 B1* | 12/2012 | Eshkenazi | | G06Q 30/02 |
| | | | | 379/265.06 |
| 8,683,437 B1* | 3/2014 | Castillo | | G10L 15/1822 |
| | | | | 717/124 |
| 8,687,776 B1* | 4/2014 | Reynolds | | G06Q 30/02 |
| | | | | 379/88.18 |
| 8,767,718 B2* | 7/2014 | Forbes | | G10L 15/22 |
| | | | | 370/356 |
| 9,135,147 B2* | 9/2015 | Artzi | | G06F 11/3676 |
| 2008/0114594 A1* | 5/2008 | Forbes | | G10L 15/22 |
| | | | | 704/235 |
| 2009/0041215 A1* | 2/2009 | Schmitt | | G10L 13/00 |
| | | | | 704/258 |
| 2013/0246053 A1* | 9/2013 | Scott | | G10L 15/26 |
| | | | | 704/201 |
| 2013/0273976 A1* | 10/2013 | Rao | | G06F 17/2785 |
| | | | | 704/9 |
| 2015/0092929 A1* | 4/2015 | Blanchard | | G10L 15/22 |
| | | | | 379/88.01 |
| 2015/0189086 A1* | 7/2015 | Romano | | G06F 17/271 |
| | | | | 379/265.09 |
| 2016/0098988 A1* | 4/2016 | Goussard | | G10L 15/18 |
| | | | | 704/257 |
| 2016/0203002 A1* | 7/2016 | Kannan | | G10L 15/22 |
| | | | | 715/708 |
| 2018/0129484 A1* | 5/2018 | Kannan | | G10L 15/1815 |
| 2018/0329878 A1* | 11/2018 | Hirzel | | G06F 17/279 |
| 2018/0332447 A1* | 11/2018 | Rakovitsky | | G06F 11/3438 |
| 2019/0116136 A1* | 4/2019 | Baudart | | G06F 17/2785 |

* cited by examiner

Fig. 6

INFORMATION FLOW ANALYSIS FOR CONVERSATIONAL AGENTS

FIELD OF THE INVENTION

The present invention relates to conversational agents and natural language understanding.

BACKGROUND OF THE INVENTION

Virtual interactive conversational agents, which are commonly referred to as chatbots, are used with increasing frequency, for example, to interact with customers. Available frameworks for constructing conversational agents make the creation of conversational agents easy, increasing the rate of creation of conversational agents and allowing the creation of conversational agents by programmers that are not experts in artificial intelligence.

Some conversational agents communicate or interact using either text commands or voice commands. Other conversational agents utilize the content of a natural language conversation. However, virtual conversational agents are not as proficient as human beings in understanding a natural language conversation. Therefore, these virtual conversational agents have an associated level of accuracy and make mistakes based on a misunderstanding of the natural language conversation or an improper identification of an intended action contained in the natural language conversation. Given the current level of accuracy associated with virtual conversational agents, actions that the virtual conversational agents are allowed to take are limited to relatively simple or innocuous tasks, e.g., turning lights on and off or adjusting the volume of music coming out of a speaker. Consequences or repercussions associated with these simple tasks are low and easily reversed or rectified.

With increased sophistication and quality, the level of understanding and accuracy of natural language conversation by the conversational agents increases. This increase in accuracy will prompt the use of conversational agents to execute more advanced actions. These more advanced actions can be associated with tasks having a higher risk level, e.g., transferring money or charging a credit card. Improper identification of these tasks from a natural language conversation and the subsequent improper execution of these higher risk tasks can result in consequences that are not easily reversed and that have monetary consequences. As the level of risks associated with tasks increases, the associated level of adverse consequences also increases.

The increased risk levels and associated adverse consequences motivate designers and creators of conversational agents to construct these conversational agents to confirm the actions that the conversational agent interprets from the natural language conversation. However, the designers and creators may not think to include these confirmations or may not adequately or completely identify inputs and actions that could trigger high risk actions having associated serious consequences.

SUMMARY OF THE INVENTION

Exemplary embodiments are directed to systems and methods that ensure the creation of conversational agents that prevent the execution of important or consequential actions without confirmation of the intent of the participant in the conversation. A dialogue system conducts a conversation between the conversational agent and live participant in accordance with a model of the conversational flow. The model of conversational flow directs, creates, and extends a conversation in accordance with inputs received from the participant. These inputs include natural language conversation. The model of the conversational flow also provides for actions that are taken by the conversational agent and dialogue system in response to the intent of the live participant as understood from inputs obtained from the natural language conversation. Therefore, understanding of the natural language inputs and associated intent of the live participant is important. As this understanding and the associated intent should be confirmed for consequential actions, exemplary embodiments conduct information flow analysis on a model of the conversational flow to check that confirmation nodes are included in the model of the conversational flow for all inputs that could trigger consequential actions.

Exemplary embodiments are directed to a method for information flow analysis of conversational agents. A conversational flow specification created by an author and prescribing operation of a conversational agent is analyzed. The conversational flow specification contains actions to be taken, inputs triggering the actions and input confirmations executed after receipt of a given input and before triggering a given action. The actions, inputs and input confirmations define conversational flow paths through the conversational flow specification. Unconfirmed conversational flow paths through the conversational flow specification are identified. Each unconfirmed conversational flow path includes only inputs and actions. The unconfirmed conversational flow paths are reported or communicated to the author.

Exemplary embodiments are also directed to a computer-readable medium containing a computer-readable code that when read by a computer causes the computer to perform a method for information flow analysis of conversational agents. A conversational flow specification created by an author and prescribing operation of a conversational agent is analyzed. The conversational flow specification contains actions to be taken, inputs triggering the actions and input confirmations executed after receipt of a given input and before triggering a given action. The actions, inputs and input confirmations define conversational flow paths through the conversational flow specification. Unconfirmed conversational flow paths through the conversational flow specification are identified. Each unconfirmed conversational flow path includes only inputs and actions. The unconfirmed conversational flow paths are reported or communicated to the author.

Exemplary embodiments are directed to a system for information flow analysis of conversational agents. The system includes a database storing at least one conversational flow specification created by an author and prescribing operation of a conversational agent. The conversational flow specification includes actions to be taken, inputs triggering actions and input confirmations executed after receipt of a given input and before triggering a given action. The actions, inputs and input confirmations are grouped into a plurality of execution sequences, and each execution sequence defines a conversational flow path through the conversational flow specification. A control-flow and data-flow analysis engine is executing on a computing system in communication with the database to analyze the conversational flow specification and to identify unconfirmed conversational flow paths through the conversational flow specification. The unconfirmed conversational flow paths containing only inputs and actions. An input and output module is executing on the computing system and is in communication with the control-flow and data-flow analysis engine to report the unconfirmed conversational flow paths to the author.

DETAILED DESCRIPTION

Exemplary embodiments provide for the analysis of the potential flow of information and control through a conversational agent to determine if the conversational agent can create a conversational path from a user input to an action that does not require confirmation regardless of whether the input was adequately understood by the conversational agent or the action is a consequential action. A conversational agent is a software program executing on a computing system to create a dialogue system that can conduct a conversation or interaction between the computing system and a user, i.e., a human. This conversation is conducted in accordance with the conversational flow specification of the conversational agent as created by an author of the conversational flow specification and embodied in the software program. As used herein, conversational agent includes chatbot, talkbot, chatterbot, Bot, instant messaging (IM) bot and an interactive agent.

In general, a dialogue system can receive inputs from a user and provide outputs to a user using, for example, text, speech, graphics, haptics and gestures and other modes for communication on both the input and output channel. Input speech is typically in the form of commands or sentences spoken in a natural language format. Therefore, the dialogue system and conversational agent utilize natural language understanding to identify and to derive inputs from the natural language phrases spoken by the user. In one embodiment, natural language understanding is provided by a natural language understanding unit or module that can be incorporated into the conversational agent and that is executing in the dialogue system. Natural language understanding includes identifying, for example, proper names, types of speech, syntax, semantics and actions. In general, natural language understanding is used to determine the intent of the user, e.g., what actions the user wants executed or what information the user wants to be provided by the dialogue system.

Figure 1:
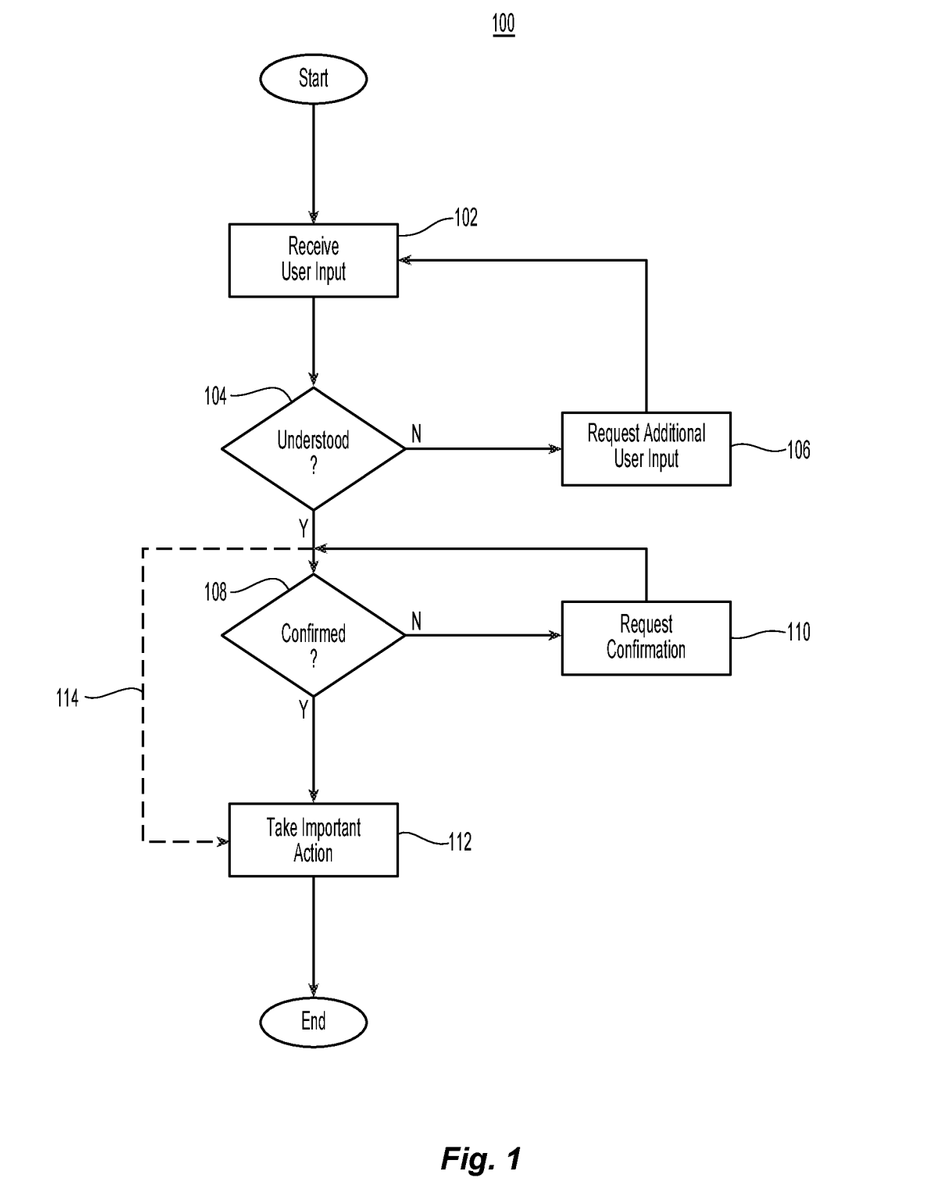
FIG. 1 is a flow chart illustrating an embodiment of input processing and confirmation in a conversational agent.

Referring initially to FIG. 1, an embodiment of a conversational flow path 100 facilitated by a conversational agent in accordance with the conversational flow specification prescribing the operation of the conversational agent is illustrated. The conversational flow specification includes actions that can be taken, an identification of inputs that trigger the actions and input confirmations. The actions, inputs and input confirmations are grouped or arranged to define a plurality of conversational flow paths. An input is received from a user 102 who is interfacing with the conversational agent. This input can be provided in a plurality of formats including, for example, text data, data from sensors and a natural language format, either spoken or typed. For example, the user can state or enter "Open the file 'delete.txt'". Upon receipt of this input, the conversational agent determines whether or not an intent for taking a particular action was understood in the input 104. Understanding of the input varies depending on the type of input. For example, typed natural language text has a higher likelihood of being understood than spoken natural language text. Therefore, spoken natural language inputs have a higher relative uncertainty, and the format of the received input is taken into consideration by the conversational agent when determining if the received input was understood.

If the received input was not understood, then the conversational agent requests additional input from the user 106. For example, the conversational agent can ask the user to resubmit the input or to rephrase the input. The request for additional user input or clarification can be repeated until the received user input is understood. The conversational agent using, for example, natural language understanding, determines the intent of the user from the user input. For the exemplary input "Open the file 'delete.txt'", the conversational agent can interpret the intent of the user as "open", "file" or "delete". This interpretation of the intent of the user is associated with an action. These actions can be rather innocuous and easily reversed, "open", or can have more significant consequences that may be difficult to impossible to reverse, "delete". Actions with more significant consequences can be referred to as important actions or consequential actions. In addition to actions that may not be easily reversible, consequential actions can have significant financial or security repercussions, for example, transferring money or accessing a restricted network domain.

A conversational flow path 114 that only includes the inputs and associated actions takes or executes the interpreted action 112, including a consequential action, without confirming the interpreted intent with the user. To prevent consequential actions from being inadvertently or incorrectly performed, the conversational agent determines if the intent interpreted by the conversational agent from the user input has been confirmed 108. In one embodiment, all interpreted intent and actions are confirmed. Alternatively, at least consequential actions are confirmed. If the interpreted intent and action have not been confirmed, the conversational agent requests confirmation from the user 110. Confirmation requests can be repeated until the intent is confirmed. Once the content is confirmed, the action, including consequential or important actions are taken 112.

Figure 2:
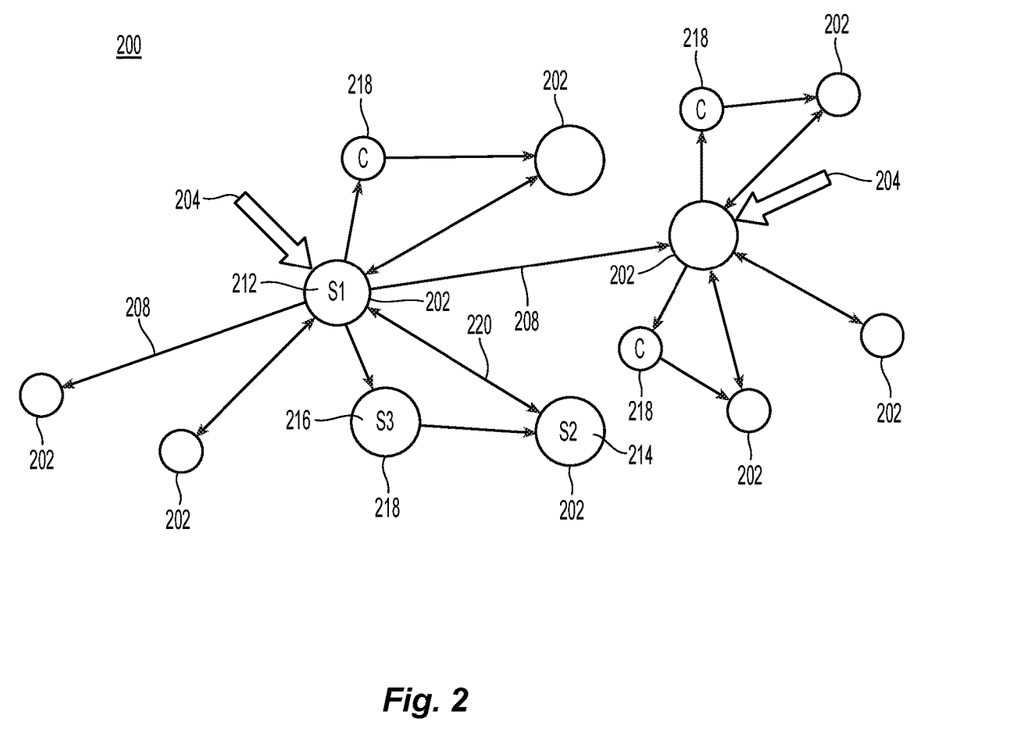
FIG. 2 is a schematic representation of an embodiment of a state machine specification for a conversational agent.

The actions of a conversational agent or bot are prescribed by or defined in the conversational flow specification. In one embodiment, the conversational flow specification is a state machine. Suitable state machines include, but are not limited to, finite state machines (FSM). Referring now to FIG. 2, a portion of a state machine 200 that can be used to define the actions and therefore conversational flow paths of the conversational agent is illustrated. The state machine includes a plurality of states that are nodes 202 within the state machine that receive user inputs 204. Each state or node is associated with one or more actions. In one embodiment, the state machine processes the input received at a given node and uses this input to transition the state machine to a new state along a given edge 208. Alternatively, the state machine can use the received input to perform an action, including a consequential action. In one embodiment, the state machine can then transition to a new state following processing of the action.

Thus, control flow through the machine is defined by the possible ways the state machine can transition from state to state. Data flow in the state machine is represented by actions that read and write named locations in a context object, which is closely analogous to reading and writing local variables in a traditional program. In one embodiment, the state machine, M, is defined as M=<S, A>, where S is a set of state labels and A is a function mapping each state in S to a set of actions. Transitions are special actions within the state machine containing a predicate P and a new state N pair. For transitions, M moves to state N if P is true.

Exemplary embodiments utilize control-flow and data-flow analysis, e.g., static analysis, on the conversational flow specification, e.g., the state machine, to enforce desired properties within the conversational flow specification. Suitable desired properties include, but are not limited to, confirmation detection. The analysis looks for paths or steps within a conversational flow path where a first step, e.g., node or state, influences or is influenced by a second or subsequent step, e.g., node or state. Examples of influences include, but are not limited to, deciding whether a particular action is taken in the second step, deciding whether to advance to a second state and identifying the desired or proper subsequent step. In one embodiment, influence includes control dependence. A definition of control dependence along with examples of control dependence and algorithms for constructing control dependence are provided, for example, in R. Cytron et al., "Efficiently Computing State Single Assignment Form and the Control Dependence Graph", ACM Trans. Program. Lang. Syst., Vol. 13, No. 4, pp. 451-490 (October 1991), the entire disclosure of which is incorporated herein by reference. Given the state machine M, a state S2 214 is influenced by a state S1 212 if S2 is control dependent on S1 and state S1 consumes user input. If the input consumed at S1 is uncertain and/or an action at S2 is important, confirmation of the input within the possible flow paths of the conversational flow specification, for example, using input confirmations represented as confirmation node S3 216, is enforced. In one embodiment of confirmation, if a state S2 214 is influenced by a state S1 212, then state S3 216 is a confirmation node if S2 is control dependent on S3 and S3 takes an action defined to be confirming with respect to S1.

Exemplary embodiments, therefore, analyze conversational flow specifications. For a conversational flow specification arranged as a state machine, a set A of all states that contain important actions are identified. For each state, i.e., S2, in the set of all states, a set I of all nodes that influence S2, i.e., S1, is created. For each node S1 in I, the analysis of the state machine looks for an associated confirmation node S3 216. Therefore, the input, action, and input confirmation define a confirmed flow path 218. If no confirmation node S3 is identified, then the conversational flow path is an unconfirmed flow path 220. This represents an error, and the unconfirmed flow paths are identified and reported to the author of the state machine. Communication of the unconfirmed flow paths can be made with or without recommendations for correcting or eliminating the uncontrolled or unconfirmed flow paths.

Figure 3:
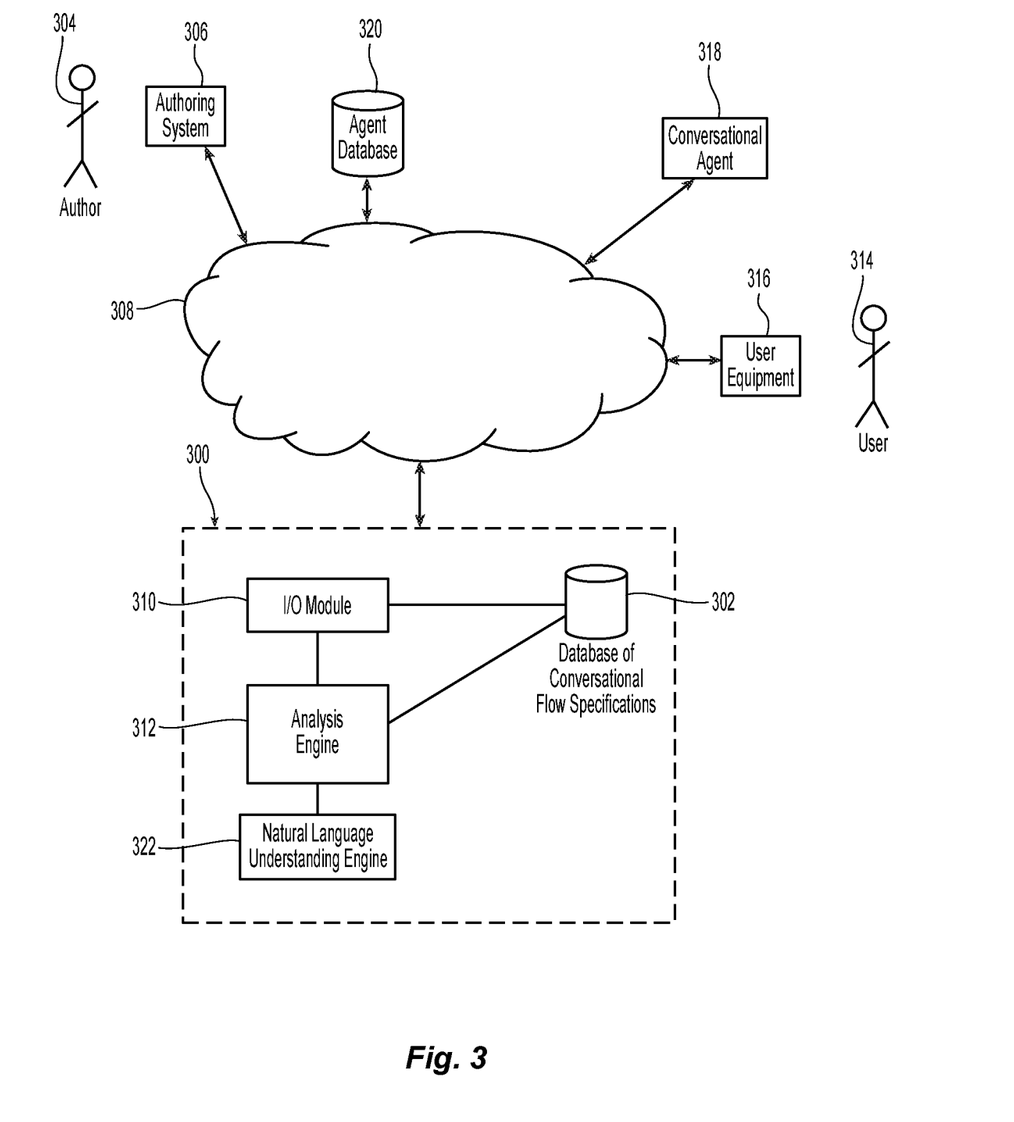
FIG. 3 is a schematic representation of an embodiment of a system for information flow analysis of conversational agents.

Referring now to FIG. 3, exemplary embodiments are directed to a system for information flow analysis of conversational agents 300. The system is executing on at least one computing system and includes at least one database 302. The database stores one or more conversational flow specifications. Each conversational flow specification is created by an author 304 using an authoring system 306 that is in communication with the system for information flow analysis of conversational agents across one or more local or wide area networks. Suitable authoring systems for creating conversational flow specifications are known and available in the art. Each conversation flow specification prescribes operation of the conversational agent and includes actions to be taken, inputs triggering actions, e.g., inputs received from a user of the conversational agent, and input confirmations executed after receipt of a given input and before triggering a given action. The actions, inputs and input confirmations can be grouped into a plurality of execution sequences, and each execution sequence defines a conversational flow path through the conversational flow specification. In one embodiment, the system includes an input and output module 310 executing on the computing system and in communication with the database. The input and output module is in communication with the authoring system associated with the author to receive the conversational flow specification and save the conversational flow specification in the database.

The system includes a control-flow and data-flow analysis engine 312 executing on the computing system and in communication with the database and input and output module. The control-flow and data-flow analysis engine reads the conversational flow specification from the database and analyzes the conversational flow specification. In one embodiment, the analysis engine utilizes methods and algorithms for control-flow analysis and data-flow analysis and performs at least one of static and dynamic analysis of the conversational flow specification to follow conversational flow paths that can be created using the conversational flow specification. This analysis looks at inputs, sources of the inputs, actions triggered by the inputs and input confirmations associated with the inputs and actions. These inputs can be received from a user 314 interfacing with a conversational agent 318 through user equipment 310, for example, a computer, tablet computer or smartphone. The conversational agent is executing an instance of the conversational flow specification that is also stored in a conversational agent database 320 outside the system for information flow analysis of conversational agents 300. Any suitable control-flow and data-flow analysis tools known and available in the art for analyzing software programs can be used. Preferably, the analysis is static analysis performed on the conversational flow specification without executing the conversational flow specification or running the conversational agent.

The analysis engine identifies unconfirmed conversational flow paths through the conversational flow specification. These unconfirmed conversational flow paths contain only inputs received, for example at a given node, and actions triggered by those actions. The unconfirmed conversational flow paths allow the actions to be taken without input or intent confirmation. The analysis engine uses the input and output module to report the unconfirmed conversational flow paths to the author.

In one embodiment, the conversational flow specification is a state machine having a plurality of states. Each state is associated with at least one of the actions, and each action is triggered by at least one input. Each input upon triggering by a given action either transitions the state machine to a secondary state or is consumed by an influencing or influenced secondary state. Each given state is control dependent on influencing or influenced secondary states that consume inputs from that given state. In one embodiment, the control-flow and data-flow analysis engine identifies important states from the plurality of states. Each important state is associated with important actions that can yield unintended consequences above a pre-defined threshold of severity if executed based on an improper interpretation of inputs by the conversational agent. In addition, the control-flow and data-flow analysis engine identifies all influencing or influenced secondary states asserting control dependence on each important state. The unconfirmed conversational flow paths include important inputs received at important states that trigger important actions that result in the consumption of the important inputs by secondary states.

In one embodiment, the system for information flow analysis of conversational agents includes a natural language understanding unit 322 in communication with the control-flow and data-flow analysis engine to provide interpretation and understanding of natural language inputs or potential natural language inputs. In one embodiment, the control-flow and data-flow analysis engine can also determine modifications to the conversational flow specification that can be used to correct or eliminate the unconfirmed flow paths. For example, the conversational flow specification can be modified to remove or prevent the execution of unconfirmed consequential actions. Alternatively, the conversational flow specification can be modified to include input confirmations in each unconfirmed conversational flow path.

Figure 4:
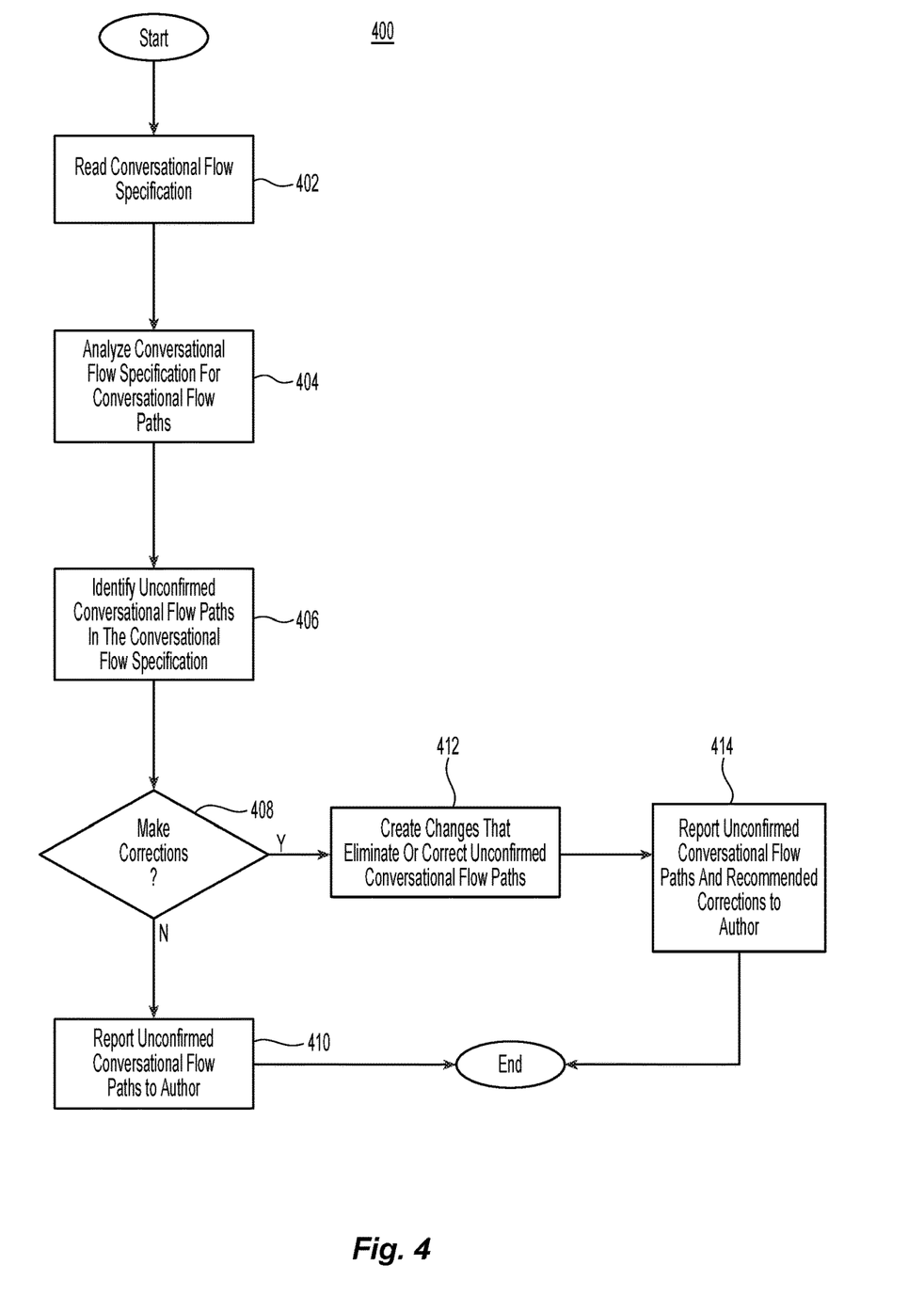
FIG. 4 is a flow chart illustrating an embodiment of a method for information flow analysis of conversational agents.

Referring now to FIG. 4, exemplary embodiments are directed to a method for information flow analysis of conversational agents 400. A conversation flow specification to be analyzed is read 402. The conversational flow specification was created by an author and prescribes operation of a conversational agent. The conversational flow specification includes actions to be taken by the conversational agent, inputs received from a user of the conversational agent that trigger the actions and input confirmations executed after receipt of a given input and before triggering a given action. Each input confirmation requests additional input from a user associated with a given input to confirm intent of the action interpreted from input received from the user.

The actions, inputs and input confirmations define conversational flow paths, or potential conversational flow paths, through the conversational flow specification. Therefore, the conversational flow specification is analyzed to identify conversational flow paths 404. Preferably, the conversational flow specification is analyzed to identify all possible flow paths and all possible inputs that trigger actions to be performed by the conversational agent in the dialogue system. Suitable methods for analysis perform at least one of control-flow analysis and data-flow analysis. Suitable methods for control-flow analysis and data-flow analysis are known and available in the art. The analysis can be static analysis or dynamic analysis. Preferably, the analysis is static analysis performed on the conversational flow specification without executing the conversational flow specification or running the conversational agent.

Unconfirmed conversational flow paths through the conversational flow specification are identified 406. Each unconfirmed conversational flow path includes only inputs and actions and does not include any input confirmations. In one embodiment, unconfirmed conversational flow paths are identified that have inputs received in a format yielding a relative uncertainty in a content of the inputs as interpreted by the conversational agent that is above a pre-defined level of uncertainty. In one embodiment, this format is a natural language format, either spoken or typed. In another embodiment, unconfirmed conversational flow paths are identified that have important actions that can yield unintended consequences above a pre-defined threshold of severity if executed based on an improper interpretation of at least one of inputs and intentions by the conversational agent. These important actions can also be considered consequential actions. Various methods can be used to determine the severity level associated with the unintended consequences of an action. For example, consequential actions can be identified by type of action. For example, certain types of actions such as financial transactions or security sensitive data accesses are considered consequential action. Alternatively, consequential actions are identified by the severity or dispositive nature of the results of the actions. For example, certain types of actions permanently delete data or irrevocably transfer funds. In one embodiment, a set of important actions are identified. The actions in the set of actions are contextually relevant to the conversational flow specification. For example, the set of actions can be derived from the application programming interface, based on the use of the conversational agent by a financial institution or based on the potential domains accessed by the user of the conversational agent. Having identified the important actions, unconfirmed conversational flow paths containing at least one of the important actions from the identified set of important actions are identified.

Having identified unconfirmed conversational flow paths, a determination is made regarding whether modifications to the conversational flow path are going to be determined and proposed to the author 408. If not, the unconfirmed conversational flow paths are reported to the author 410. If modification are to be recommended, changes or modifications to the conversational flow path are created 412. These modifications can include elimination of unconfirmed consequential actions or inserting input confirmations between each input and subsequent unconfirmed action in each unconfirmed flow path. In one embodiment, a single modification is proposed for each unconfirmed flow path. Alternatively, a plurality of proposed modifications is determined for at least one unconfirmed flow path. Once the proposed modifications are determined, the unconfirmed conversational flow paths and the proposed modifications are communicated to the author 414.

In one embodiment, the conversational flow specification is a state machine containing a plurality of states. Each state is associated with at least one of the actions, and each action is triggered by at least one input. Each input upon triggering by a given action either transitions the state machine to a secondary state or is consumed by an influencing or influenced secondary state. Therefore, each given state is control dependent with influencing or influenced secondary states that consume inputs from that given state. In one embodiment, important states from the plurality of states are identified. Each important state is associated with important actions that can yield unintended consequences above a pre-defined threshold of severity if executed based on an improper interpretation of inputs by the conversational agent. All influencing or influenced secondary states asserting control dependence on each important state are identified. The unconfirmed conversational flow paths include important inputs received at important states that trigger important actions that result in the consumption of the important inputs by secondary states.

In one embodiment, input confirmations are confirmation states within the state machine, and unconfirmed conversational flow paths are identified by identifying each influencing or influenced secondary state capable of consuming important inputs without receiving a confirming input from one of the confirmation states. In one embodiment, the reporting of the unconfirmed conversational flow paths includes reporting important inputs that when received trigger important actions resulting in the consumption of important inputs at influencing or influenced secondary states without receiving the confirming input from one of the confirmation states.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, apart from limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 5:
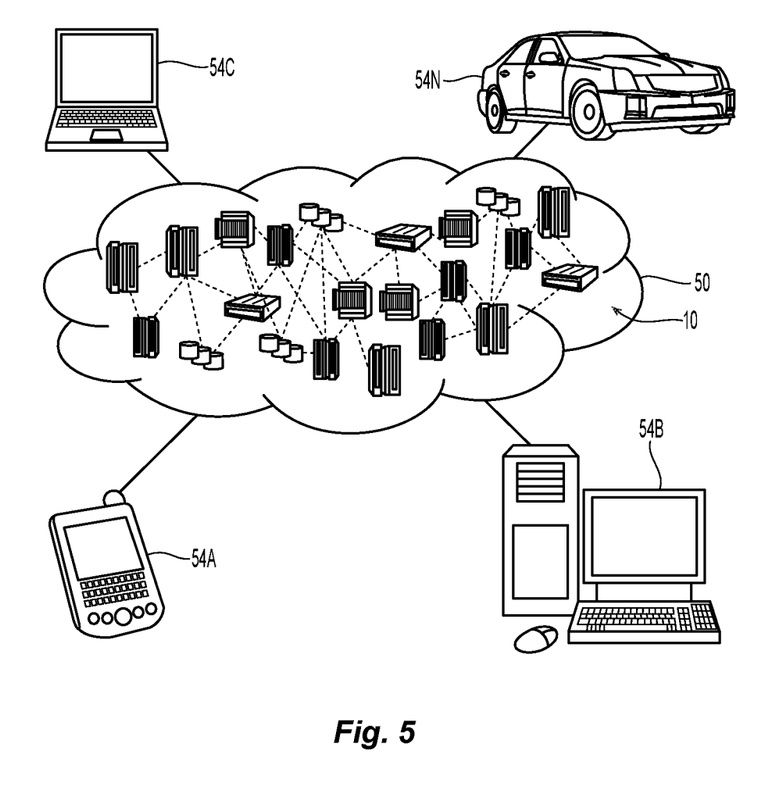
FIG. 5 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 5, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection, e.g., using a web browser.

Figure 6:
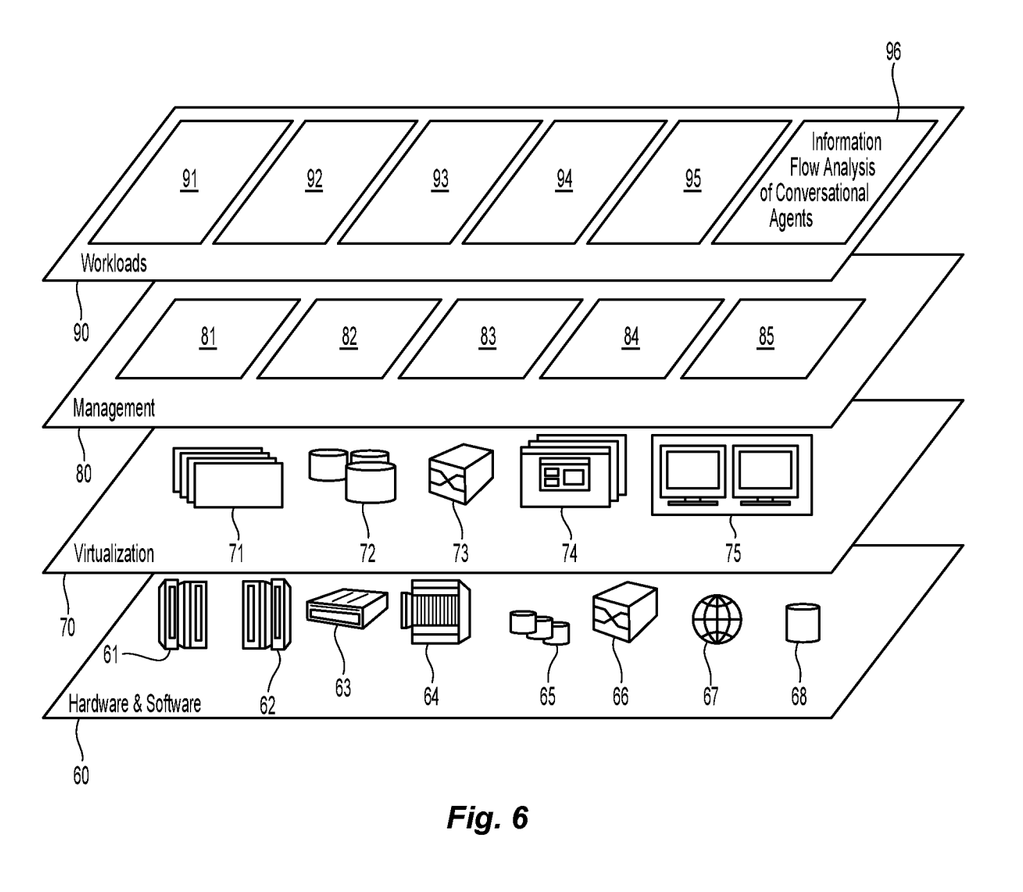
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided. A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and information flow analysis of conversational agents 96.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for information flow analysis of conversational agents and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for information flow analysis of conversational agents, the method comprising:
   analyzing a conversational flow specification created by an author and prescribing operation of a conversational agent, the conversational flow specification comprising actions to be taken, inputs triggering the actions and input confirmations executed after receipt of a given input and before triggering a given action, the actions, inputs and input confirmations defining conversational flow paths through the conversational flow specification;
   identifying unconfirmed conversational flow paths through the conversational flow specification, each unconfirmed conversational flow path comprising only inputs and actions; and
   reporting the unconfirmed conversational flow paths to the author.

2. The method of claim 1, wherein analyzing the conversational flow specification comprises analyzing the conversational flow specification statically without operating the conversational agent.

3. The method of claim 1, wherein identifying the unconfirmed conversational flow paths further comprises identifying unconfirmed conversational flow paths comprising inputs received in a natural language format yielding a relative uncertainty in a content of the inputs as interpreted by the conversational agent that is above a pre-defined level.

4. The method of claim 1, wherein identifying the unconfirmed conversational flow paths further comprises identifying unconfirmed conversational flow paths comprising important actions that can yield unintended consequences above a pre-defined threshold of severity if executed based on an improper interpretation of inputs by the conversational agent.

5. The method of claim 4, wherein:
the method further comprises identifying a set of important actions contextually relevant to the conversational flow specification; and
identifying the unconfirmed conversational flow paths further comprises identifying unconfirmed conversational flow paths comprising important actions from the identified set of important actions.

6. The method of claim 1, wherein the method further comprises:
determining modifications to the conversational flow specification that eliminate the unconfirmed flow paths; and
communicating the modifications to the author;
wherein the modifications comprise inserting input confirmations between each input and subsequent unconfirmed action in each unconfirmed flow path.

7. The method of claim 1, wherein the conversational flow specification comprises a state machine
comprising a plurality of states, each state is associated with at least one of the actions, each action is triggered by at least one input, each input upon triggering by a given action either transitions the state machine to a secondary state or is consumed by an influenced secondary state and each given state is control dependent on influenced secondary states that consume inputs from that given state.

8. The method of claim 7, wherein identifying unconfirmed conversational flow paths further comprises:
identifying important states from the plurality of states, each important state associated with important actions that can yield unintended consequences above a pre-defined threshold of severity if executed based on an improper interpretation of inputs by the conversational agent; and
identifying all influenced secondary states asserting control dependence on each important state, the unconfirmed conversational flow paths comprising important inputs received at important states that trigger important actions that result in the consumption of the important inputs by secondary states.

9. The method of claim 8, wherein:
the input confirmations comprise confirmation states within the state machine; and
identifying unconfirmed conversational flow paths further comprises identifying each influenced secondary state capable of consuming important inputs without receiving a confirming input from one of the confirmation states.

10. The method of claim 9, wherein reporting the unconfirmed conversational flow paths further comprise reporting important inputs that when received trigger important actions resulting in the consumption of important inputs at influenced secondary states without receiving the confirming input from one of the confirmation states.

11. The method of claim 1, wherein each input confirmation requests additional input from a user associated with the given input to confirm intent of action interpreted from input received from the user.

12. A non-transitory computer-readable medium containing a computer-readable code that when read by a computer causes the computer to perform a method for information flow analysis of conversational agents, the method comprising:
analyzing a conversational flow specification created by an author and prescribing operation of a conversational agent, the conversational flow specification comprising actions to be taken, inputs triggering the actions and input confirmations executed after receipt of a given input and before triggering a given action, the actions, inputs and input confirmations defining conversational flow paths through the conversational flow specification;
identifying unconfirmed conversational flow paths through the conversational flow specification, each unconfirmed conversational flow path comprising only inputs and actions; and
reporting the unconfirmed conversational flow paths to the author.

13. The non-transitory computer-readable medium of claim 12, wherein identifying the unconfirmed conversational flow paths further comprises identifying unconfirmed conversational flow paths comprising inputs received in a natural language format and yielding a relative uncertainty in a content of the inputs as interpreted by the conversational agent that is above a pre-defined level.

14. The non-transitory computer-readable medium of claim 12, wherein:
the method further comprises identifying a set of important actions contextually relevant to the conversational flow specification and that can yield unintended consequences above a pre-defined threshold of severity if executed based on an improper interpretation of inputs by the conversational agent; and
identifying the unconfirmed conversational flow paths further comprises identifying unconfirmed conversational flow paths comprising important actions from the identified set of important actions.

15. The non-transitory computer-readable medium of claim 12, wherein the method further comprises:
determining modifications to the conversational flow specification that eliminate the unconfirmed flow paths; and
communicating the modifications to the author;
wherein the modifications comprise inserting input confirmations between each input and subsequent unconfirmed action in each unconfirmed flow path.

16. The non-transitory computer-readable medium of claim 12, wherein the conversational flow specification comprises a state machine comprising a plurality of states, each state is associated with at least one of the actions, each action is triggered by at least one input, each input upon triggering by a given action either transitions the state machine to a secondary state or is consumed by an influenced secondary state and each given state is control dependent on influenced secondary states that consume inputs from that given state.

17. The non-transitory computer-readable medium of claim 16, wherein identifying unconfirmed conversational flow paths further comprises:
   identifying important states from the plurality of states, each important state associated with important actions that can yield unintended consequences above a pre-defined threshold of severity if executed based on an improper interpretation of inputs by the conversational agent; and
   identifying all influenced secondary states asserting control dependence on each important state, the unconfirmed conversational flow paths comprising important inputs received at important states that trigger important actions that result in the consumption of the important inputs by secondary states.

18. The non-transitory computer-readable medium of claim 17, wherein:
   the input confirmations comprise confirmation states within the state machine;
   identifying unconfirmed conversational flow paths further comprises identifying each influenced secondary state capable of consuming important inputs without receiving a confirming input from one of the confirmation states; and
   reporting the unconfirmed conversational flow paths further comprises reporting important inputs that when received trigger important actions resulting in the consumption of important inputs at influenced secondary states without receiving the confirming input from one of the confirmation states.

19. A system for information flow analysis of conversational agents, the system comprising:
   a database storing at least one conversational flow specification created by an author and prescribing operation of a conversational agent, the conversational flow specification comprising actions to be taken, inputs triggering actions and input confirmations executed after receipt of a given input and before triggering a given action, the actions, inputs and input confirmations grouped into a plurality of execution sequences, each execution sequence defining a conversational flow path through the conversational flow specification;
   a control-flow and data-flow analysis engine executing on a computing system in communication with the database to analyze the conversational flow specification and to identify unconfirmed conversational flow paths through the conversational flow specification comprising only inputs and actions; and
   an input and output module executing on the computing system and in communication with the control-flow and data-flow analysis engine to report the unconfirmed conversational flow paths to the author.

20. The system of claim 19, wherein:
the conversational flow specification comprises a state machine comprising a plurality of states, each state is associated with at least one of the actions, each action is triggered by at least one input, each input upon triggering by a given action either transitions the state machine to a secondary state or is consumed by an influenced secondary state and each given state is control dependent on influenced secondary states that consume inputs from that given state; and
the control-flow and data-flow analysis engine using static analysis of the state machine:
   identifies important states from the plurality of states, each important state associated with important actions that can yield unintended consequences above a pre-defined threshold of severity if executed based on an improper interpretation of inputs by the conversational agent; and
   identifies all influenced secondary states asserting control dependence on each important state, the unconfirmed conversational flow paths comprising important inputs received at important states that trigger important actions that result in the consumption of the important inputs by secondary states.

* * * * *